United States Patent [19]

Timpe

[11] 3,974,436

[45] Aug. 10, 1976

[54] CIRCUIT ARRANGEMENT FOR AN ELECTRIC MELTING FURNACE

[75] Inventor: Wolfgang Timpe, Erlangen, Germany

[73] Assignee: Siemens Aktiengesellschaft, Munich, Germany

[22] Filed: May 15, 1975

[21] Appl. No.: 577,851

[30] Foreign Application Priority Data

May 22, 1974 Germany .......................... 2424825

[52] U.S. Cl. .......................... 321/13; 219/131 WR; 321/16; 330/86

[51] Int. Cl.² .......................... H02M 1/18

[58] Field of Search .......................... 219/131 R, 131 WR; 307/235, 235 A; 321/5, 16, 18, 40, 11-14; 323/38, 39; 330/86; 340/248 C, 248 E, 253 A, 253 B, 253 E

[56] References Cited

UNITED STATES PATENTS

| | | | |
|---|---|---|---|
| 3,045,168 | 7/1962 | Fellendorf | 321/14 |
| 3,045,224 | 7/1962 | Colaiaco | 321/14 X |
| 3,370,216 | 2/1968 | Bowar et al. | 340/248 E |
| 3,497,830 | 2/1970 | Colton et al. | 330/86 X |
| 3,764,885 | 10/1973 | Buxbaum et al. | 321/13 |

FOREIGN PATENTS OR APPLICATIONS

| | | | |
|---|---|---|---|
| 237,997 | 7/1969 | U.S.S.R. | 340/248 E |

*Primary Examiner*—William M. Shoop
*Attorney, Agent, or Firm*—Kenyon & Kenyon Reilly Carr & Chapin

[57] ABSTRACT

The invention concerns a circuit arrangement for use with an electric melting furnace of a type which is fed by a converter, the latter converter being equipped with thyristors and controlled by a control unit and a series-connected current regulator. More specifically, in accord with the invention, the circuit arrangement is provided with monitoring circuits for monitoring the operation of the thyristors. These monitoring circuits, in turn, generate signals which control switches for selectively short-circuiting the feedback resistors of the regulator.

5 Claims, 1 Drawing Figure

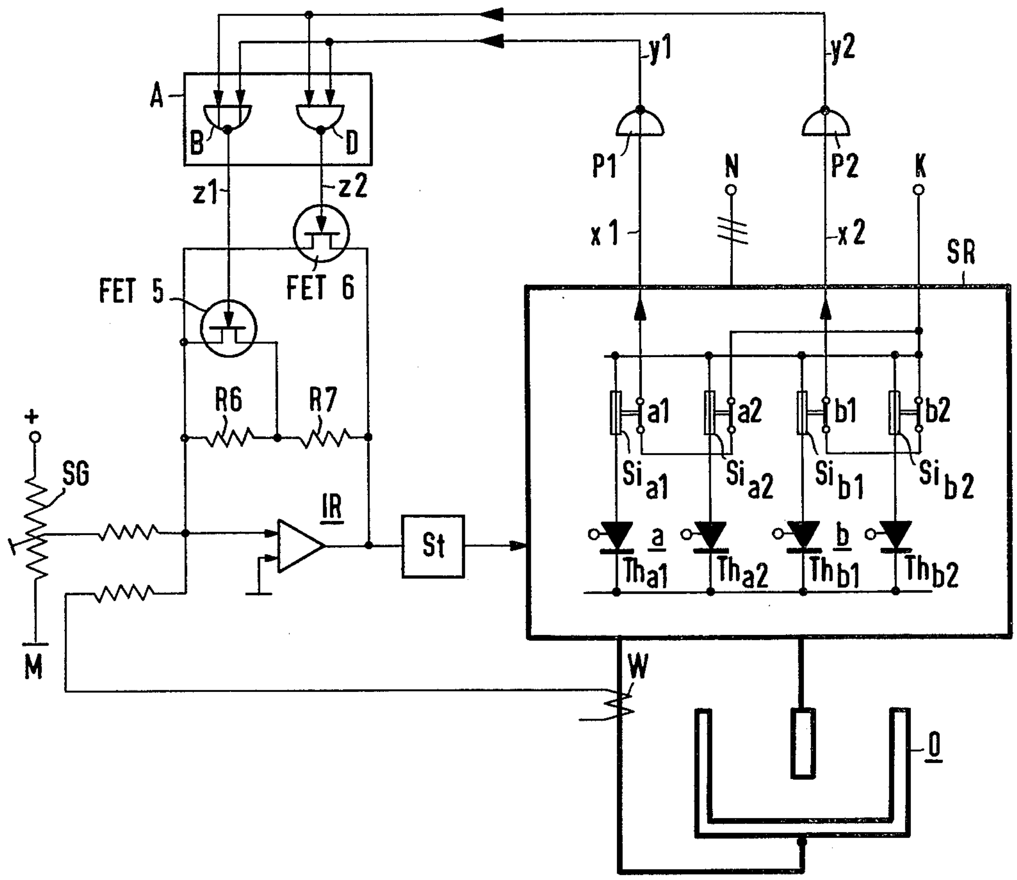
y1
y2
A
B
D
P1
P2
N
K
z1
z2
x1
x2
SR
FET 5
FET 6
a1
a2
b1
b2
R6
R7
+
SG
Si a1
Si a2
Si b1
Si b2
IR
St
a
b
Th a1
Th a2
Th b1
Th b2
M
W
O

CIRCUIT ARRANGEMENT FOR AN ELECTRIC MELTING FURNACE

BACKGROUND OF THE INVENTION

1. Field of the Invention

The invention concerns a circuit arrangement for an electric melting furnace which is supplied via a controlled converter, the latter converter being equipped with thyristors and being controlled by a control unit and a series-connected regulator. More particularly, the invention concerns a circuit arrangement comprising a monitoring circuit (supervisory circuit) which develops signals indicative of the operational states of the converter thyristors.

In a circuit arrangement of the above-described type, it would be advantageous for the circuit arrangement to ensure that emergency operation of the electric melting furnace be maintained, even if one or more thyristors of the converter fail. Such a result can be realized, with the still operable thyristors, if the nominal value of the load current is reduced accordingly.

It is an object of the present invention to provide a circuit arrangement of the above-mentioned kind which is designed to additionally permit emergency operation of the electric melting furnace, in the case of failure of one or more converter thyristors.

SUMMARY OF THE INVENTION

In accordance with the principles of the present invention, the above and other objectives are realized in a circuit arrangement of the above-described type by employing the signals indicative of the operational state of the thyristors to control switching devices for shorting the ohmic resistors included in the feedback path of the circuit current regulator. In this way, if one or more of the thyristors fail, the gain of the linear regulator is reduced, thereby reducing the current being fed by the remaining operable thyristors to the electric furnace.

BRIEF DESCRIPTION OF THE DRAWING

The above and other features of the present invention will become more apparent upon reading the following detailed description which makes reference to the accompanying drawing, in which:

FIG. 1 shows a circuit arrangement in accordance with the principles of the present invention.

DETAILED DESCRIPTION

In FIG. 1, an electric melting furnace O is supplied current via a controlled converter SR which is fed from an a-c network N. This current being supplied by converter SR may lie, for instance, in the range between zero and 10 Hz. Associated with the converter SR is a control apparatus comprising a control unit St and a series-connected current regulator IR. The current regulator IR has a linear gain characteristic and includes an operational amplifier, one of whose inputs is fed an actual current value from a current transformer W arranged in the load circuit. The other input of the regulator IR is fed by a current reference value which is supplied by a reference-value transmitter SG, shown as a potentiometer. In the feedback path of the current regulator IR are disposed two ohmic resistors R6 and R7 which serve as feedback resistors. As can be appreciated, the current regulator IR ensures that during undisturbed, normal operation, the actual current value in the furnace is adjusted to the predetermined current reference value.

The converter SR comprises a number of thyristors, of which, for clarity purposes, only four thyristors, $Th_{a1}$, $Th_{a2}$, $Th_{b1}$, $Th_{b2}$ are shown in the drawing. These four thyristors belong to the same branch of the converter SR, and are divided into a thyristor group *a* and a thyristor group *b*.

To monitor the thyristor groups *a* and *b*, monitoring circuits comprising fuses and an alarm contact are provided. In particular, fuses $Si_{a1}$ and $Si_{a2}$ are connected in series with the thyristors $Th_{a1}$ and $Th_{a2}$, while fuses $Si_{b1}$ and $Si_{b2}$ are connected in series with the thyristors $Th_{b1}$ and $Th_{b2}$. The four fuses $Si_{a1}$, $Si_{a2}$, $Si_{b1}$ and $Si_{b2}$, in turn, control alarm contacts *a* 1, *a*2, *b*1 and *b*2. If anyone of the fuses blows, the associated alarm contact opens.

As shown, the alarm contacts *a*1, *a*2 of the thyristor group *a* and the alarm contacts *b*1, *b*2 of the thyristor group *b*, respectively, are each connected in series. The two series circuits *a*1, *a*2 and *b*1, *b*2, respectively, are, in turn, together connected on one side to the negative pole K of a d-c voltage source. On the other side, both series circuits are connected, via respective inverter elements P1 and P2, with an evaluation circuit A. The evaluation circuit A comprises a NOR gate B and a NAND gate D, both of which are connected on the input side with the outputs of the inverters P1 and P2, respectively. As will be discussed more fully below, the evaluation circuit A delivers a first output signal *z*1 when one of the two signals *x*1, *x*2 from the inverters P1 and P2 is present, while it delivers a second output signal *z*2 when the signals *x*1, *x*2 are simultaneously present. The signals *x*1 and *x*2 represent signals which indicate the operational states of the thyristors $Th_{a1}$, $Th_{a2}$, $Th_{b1}$ and $Th_{b2}$.

The output of the NOR gate B is connected with the control input of a first switching element, which is depicted in the drawing as a field-effect transistor FET 5. The output of NAND gate D, in turn, is connected with the control input of a second switching element which, in the present case, is also shown as a field-effect transistor FET 6. The switching path of the first field-effect transistor FET 5 is connected across the resistor R6, while the switching path of the second field-effect transistor FET 6 is connected parallel to the series circuit comprising the resistor R6 and the resistor R7. As above-indicated the latter two resistors R6 and R7 are connected into the feedback path of the current regulator IR.

The resistance of the two resistors R6 and R7 is selected to be very high as compared to the resistance of the field-effect transistors FET 5 and FET 6 when the latter are in a conducting state. In particular, each of the two resistors R6, R7 may, for instance, have a resistance of 10 kohm. As a result, when the first switching element (FET 5) is conducting, the resistor R6 will be shorted, and when the second switching element (FET 6) is conducting the series circuit comprising the two resistors R6, R7 will be shorted.

If under normal operating conditions no disturbances are present in the thyristor group *a*, then the two alarm contacts *a*1, *a*2, of the thyristor group *a* are closed. In such case, the signal *x*1 indicating the operational state of the thyristors $Th_{a1}$ and $Th_{a2}$ is assumed to be in its low state, and is designated an L-signal. With *x*1 in its low state, the output *y*1 of the inverter P1 is in a high state and is designated an H-signal. The latter signal is passed on to the first input of the NOR gate B and to the first input of the NAND gate D. Similarly, if no disturbances are present in the thyristor group *b*, the two alarm contacts *b*1 and *b*2 of the thyristor group *b* are closed and the signal *x*2 indicating the operational state of the thyristors $Th_{b1}$ and $Th_{b2}$ is also in a low state, i.e., is an L-signal. As a result, the output *y*2 of the inverter P2 is a high state signal, i.e., an H-signal. The latter signal is passed on to the second input of the NOR gate B and the second input of the NAND gate D. With no disturbances at the thyristor groups *a* and *b* their thus appears two H-signals at the inputs of the NOR gate B. These signals result in an L-signal as the output signal z1. The field-effect transistor FET 5 controlled by the signal z1 is, therefore, held in a cut-off state. The two H-signals at the inputs of the NAND gate D also result in an L-signal as the second output signal z2. The field-effect transistor FET 6, is, therefore, likewise held by the signal *z*2 in a cut-off state. The two resistors R6, R7 are, thus, fully effective in the feedback path of the current regulator IR. The latter regulator, therefore, has a set gain.

If, however, one of the alarm contacts a1 or a2 opens, due to the associated fuse $Si_{a1}$ or $Si_{a2}$ blowing as a result of a defect in the thyristors $Th_{a1}$ or $Th_{a2}$ or due to an overloading of these thyristors, the signal *x*1 indicating the operational state of the thyristors $Th_{a1}$ and $Th_{a2}$ becomes an H-signal. At the output of the inverter P1 there, thus, now appears an L-signal which is passed on to the second input of the NOR gate B and the second input of the NAND gate D. The H-signal at the first, and the L-signal at the second input of the NOR gate B result in an H-signal as the output signal *z*1. The field-effect transistor FET 5 is, thereby, made to conduct, and the first resistor R6 shorted. On the other hand, the H-signal at the first, and the L-signal at the second input of the NAND gate D still cause an L-signal to appear as the NAND gate output signal *z*2. The field-effect transistor FET 6, therefore, remains in the cut-off state. Only the second resistor R7 is now effective in the feedback path of the current regulator IR. As a result, the gain of the current regulator IR is reduced, thereby causing a corresponding reduction of the load current in the electric melting furnace O. This reduction in load current permits the load current to still be supplied by the remaining operational thyristors $Th_{b1}$ and $Th_{b2}$ without these thyristors becoming overloaded.

If there are no disturbances in the thyristor group *a*, but there are disturbances present in the thyristor group *b*, a similar operation as discussed above occurs, thereby resulting in a reduced load current which permits the thyristors $Th_{a1}$ and $Th_{a2}$ to continue to operate.

The evaluation circuit A is, thus, designed so that, when either the signal *x*1 or *x*2 indicates a fault (i.e., is an H-signal), the circuit provides a control signal to the control electrode of the field-effect transistor FET 5 which puts the former in a current-conducting state. The circuit is further designed, moreover, so that the field effect transistor FET 6 remains in the cut-off state, as long as either only the signal *x*1 or the signal *x*2 is indicating a defect in its respective thyristor group.

If, however, there are disturbances in the thyristor group *a* and at the same time in the thyristor group *b*, then both signals *x*1 and *x*2 become H-signals. There, thus, appear L-signals at both inputs of the NOR gate B and at both inputs of the NAND gate D. These signals, in turn, result in an H-signal for the signal *z*1, thereby placing the field effect transistor FET 5 into a conducting state. Likewise, the two L-signals cause the output signal *z*2 to be an H-signal which signal also places the field-effect transistor FET 6 in a current-conducting state. The series circuit comprising the resistors R6 and R7 in the feed-back path of the current regulator IR is thereby short-circuited. Short-circuiting both resistors results in a further reduction of the gain of the current regulator IR over the prior case, so that the load current in the electric melting furnace O is further reduced. This further reduction in load current permits the remaining nondisturbed thyristors in the converter SR to continue to operate without being overloaded or destroyed.

The evaluation circuit A is, thus, additionally designed so that, when the signals *x*1 and *x*2 simultaneously indicate a fault (i.e., are both H-signals), it delivers an output signal *z*2 which places the field-effect transistor FET 6 into the current-conducting state. Both resistors R6 and R7 are thereby short-circuited, which results in a further reduction of the gain of the current regulator IR. Emergency operation of the electric melting furnace O can thereby be maintained, while the disturbances are being corrected.

What is claimed is:

1. A circuit arrangement for use with an electric melting furnace comprising:

a controlled converter for supplying said furnace, said converter including a number of thyristors;

a control apparatus for controlling the signal being supplied by said converter including:

a control unit connected to said converter;

and a current regulator for feeding said control unit, said regulator comprising a feedback path comprising ohmic resistance means;

a monitoring circuit for generating at least one indicating signal indicative of the operational state of each of said thyristors;

and control switch means responsive to said indicating signal for selectively short-circuiting portions of said resistance means.

2. A circuit arrangement in accordance with claim 1 in which:

said resistance means includes a first resistor which forms a portion of said resistance means;

said thyristors are grouped in a single group;

said monitoring circuit generates a first signal indicative of the operational state of the thyristors in said single group;

and said control switch means responds to said first signal by selectively short-circuiting said first resistor.

3. A circuit arrangement in accordance with claim 1, in which:

said resistance means includes a series connection of first and second resistors each of which resistors forms a portion of said resistance means;

said thyristors are grouped into first and second groups;

said monitoring circuit generates first and second signals indicative of the states of the thyristors in said first and second groups, respectively;

said control switch means includes an evaluation circuit responsive to said first and second signals, said evaluation circuit causing the short-circuiting of said first resistor when said first-signal or said second signal indicates the failure of a thyristor of its respective group, and said evaluation circuit causing the short-circuiting of said series connection of said first and second resistors when said first and second signals indicate a failure of a thyristor of their respective groups.

4. A circuit arrangement in accordance with claim 3 in which said evaluation circuit comprises a NOR gate and a NAND gate each of which is fed the output signals from said monitoring circuit.

5. A circuit arrangement in accordance with claim 4 in which said monitoring circuit includes:

a first group of fuses each connected in series with one of the thyristors of said first group;

a second group of fuses each connected in series with one of the thyristors of said second group;

a first circuit comprising a first group of series connected alarm contacts each being associated with one of the fuses of said first group of fuses, said first circuit having one end adapted to be connected to a d-c voltage source;

a second circuit comprising a second group of series connected alarm contacts each being associated with one of the fuses of said second group of fuses, said second circuit having one end adapted to be connected to said source;

first and second inverters having inputs connected to the other ends of said first and second circuits, respectively, and outputs connected to said evaluation circuit.

* * * * *